United States Patent [19]

Woodcock

[11] 4,405,536

[45] Sep. 20, 1983

[54] PROCESSES FOR SEVERING HOLLOW FIBER MEMBRANES

[75] Inventor: Maurice L. Woodcock, Raleigh, N.C.

[73] Assignee: Monsanto Company, St. Louis, Mo.

[21] Appl. No.: 329,836

[22] Filed: Dec. 11, 1981

Related U.S. Application Data

[63] Continuation of Ser. No. 78,871, Sep. 26, 1979, abandoned.

[51] Int. Cl.³ ............................................. B32B 31/00
[52] U.S. Cl. .................................... 264/25; 264/138; 264/139; 264/159; 264/163
[58] Field of Search ................. 264/163, 25, 138, 139, 264/159

[56] References Cited

U.S. PATENT DOCUMENTS

| | | | |
|---|---|---|---|
| 2,360,950 | 10/1944 | Kilgour | 156/499 |
| 3,217,072 | 11/1965 | Schaich | 264/98 |
| 3,277,959 | 10/1966 | Withers | 165/159 |
| 3,300,559 | 1/1967 | Baehr | 264/323 |
| 3,468,731 | 9/1969 | Obeda | 156/73 |
| 3,503,288 | 3/1970 | Swartling | 82/84 |
| 3,545,168 | 12/1970 | Day | 53/37 |
| 3,655,480 | 4/1972 | Young | 156/256 |
| 3,769,396 | 10/1973 | Espinosa | 264/157 |
| 3,968,192 | 7/1976 | Hoffman | 264/36 |
| 4,132,578 | 1/1979 | Gell, Jr. | 156/158 |
| 4,183,890 | 1/1980 | Bollinger | 264/159 |
| 4,276,249 | 6/1981 | Halladay | 264/139 |

FOREIGN PATENT DOCUMENTS

| | | |
|---|---|---|
| 48-25005 | 12/1974 | Japan . |
| 55-31202 | 10/1977 | Japan . |
| 655583 | 7/1951 | United Kingdom . |
| 843483 | 8/1960 | United Kingdom . |
| 1030484 | 5/1966 | United Kingdom . |
| 1505531 | 3/1978 | United Kingdom . |

OTHER PUBLICATIONS

Central Patents Index, Accession No. 42798U, an abstract of Japanese Patent No. 48-25005 (also identified as 73-25005).

*Primary Examiner*—James H. Derrington
*Attorney, Agent, or Firm*—Thomas E. Kelley; Henry Croskell; Arthur E. Hoffman

[57] ABSTRACT

Processes are disclosed for severing a plurality of hollow fiber membranes comprised of thermoplastic material which membranes are arranged in the form of a bundle and also sealing the bores of the membranes in an essentially fluid-tight manner. The severing and sealing of essentially all of the hollow fiber membranes in the bundle can readily be accomplished without any significant decrease in membrane performance or strength. The severing and sealing of the hollow fiber membranes is accomplished by passing a heated member through the bundle in a path transverse to the orientation of the hollow fiber membranes wherein the temperature of the heated member is above the melt temperature of the hollow fiber membranes. Advantageously, the hollow fiber membranes which are severed in accordance with this invention can have a significant void volume and may be anisotropic with a thin, dense skin.

17 Claims, No Drawings

PROCESSES FOR SEVERING HOLLOW FIBER MEMBRANES

This is a continuation of application Ser. No. 078,871, filed Sept. 26, 1979 abandoned.

This invention relates to processes useful in the fabrication of permeators containing hollow fiber membranes for the separation of at least one fluid from a fluid mixture containing at least one other fluid. More particularly, this invention pertains to severing processes which sever a plurality of the hollow fiber membranes which are arranged in the form of a bundle and also seal the ends of the bores of the hollow fiber membranes in a fluid-tight manner.

Membranes in the form of hollow fibers are frequently advantageous for use in permeators in view of the relatively high membrane surface area which can be achieved per unit volume of the permeator. Moreover, hollow fibers can be self-supporting and can withstand high pressure differentials across their walls. The use of large pressure differentials is very attractive in many separation operations, e.g., ultrafiltration, reverse osmosis, the separation of gaseous mixtures and the like, in order to achieve larger driving forces for permeation and thereby provide a greater flux through the membranes.

Permeators containing hollow fiber membranes are usually characterized by having means to prevent fluid communication between the feed side and permeate exit side of the membranes except through the walls of the hollow fiber membranes. Hence, generally at least one end of each of the hollow fiber membranes in the permeator is encased, or embedded, in an essentially fluid-tight relationship in a tube sheet such that the bore of the hollow fiber membrane is in fluid communication through the tube sheet. The tube sheet is often in an essentially fluid-tight relationship with a vessel containing the hollow fiber membranes in order that fluid at the exterior of the hollow fiber membranes does not pass to the bore side except through the walls of the hollow fiber membranes. The other end of each of the hollow fiber membranes is also in an essentially fluid-tight relationship between the exterior and bore of the membrane. The desired relationship can be achieved by embedding the end of the hollow fiber membrane in a tube sheet which may be a separate tube sheet or the same tube sheet as in which the other end of the hollow fiber membrane is embedded. Alternatively, the other end of the hollow fiber membrane may be sealed in an essentially fluid-tight manner. This sealed end is herein referred to as the plug end. For purposes of this specification, permeators in which each end of the hollow fiber membranes is embedded in a separate tube sheet are referred to as double-ended permeators; and permeators in which only one end of each of the hollow fiber membranes is embedded in a tube sheet, or in which both ends of the hollow fiber membranes are embedded in the same tube sheet, are referred to as single-ended permeators.

Desirably, the fabricating of tube sheets and, in single-ended permeators, the plug end does not unduly adversely affect the strength or separation performance of the hollow fiber membranes. Hollow fiber membranes, especially anisotropic membranes having a thin dense skin, or barrier layer, supported by a more open wall structure, may be fragile. Consequently, procedures for fabricating tube sheets and plug ends should minimize the risk of damage to the hollow fiber membranes. The damage which may occur to the hollow fiber membranes may be observed as a decrease in selectivity of the membrane or a weakening of the structure of the hollow fiber membrane such that the ability to utilize the advantageously large pressure differentials may be diminished. Moreover, these fabricating procedures should be advantageously capable of being performed quickly, easily and without the exercise of an undue level of skill on the part of the fabricator.

For example, an operation usually required in fabricating of permeators is the cutting of a bundle of hollow fiber membranes. This cutting may be accomplished using a sharp knife, e.g., razor blade. However, the pressure applied during the cutting of hollow fiber membranes may be deleterious to the regions of the membrane adjacent to the cutting zone. Moreover, with bundles containing more hollow fiber membranes, the probability increases that more cutting strokes will be required to sever all of the hollow fiber membranes in the bundle and more pressure during cutting will be required to hasten the cutting operation. Hence, the risk of damage occurring to hollow fiber membranes can also increase. Other disadvantages can also result from the use of sharp knives to effect the cutting. For instance, the use of a knife may present a risk of injury to the fabricator. Furthermore, hollow fiber membranes cut with a sharp knife blade have generally open bores. Thus, when the tube sheet is to be formed, after the cutting of the hollow fiber membranes, means must be employed to prevent the material which forms the tube sheet from being drawn into the bores of the hollow fiber membranes by capillary action. Typically, a cement, wax or other removable material is applied to the ends of the hollow fiber membranes prior to the formation of the tube sheet to avoid filling the bores of the hollow fiber membrane with the material of the tube sheet. The end of the tube sheet can be removed such that the bores of the hollow fiber membranes are exposed. This technique requires additional operations (e.g., providing the cement or liquifiable material at the end of the bundle) which require manpower and handling which could increase the risk of damage to the hollow fiber membranes.

Alternatively, the bundle could be formed with the hollow fiber membranes being looped such that a single, continuous hollow fiber forms numerous lengths in the bundle, i.e., the hollow fiber membranes are in the form of hanks. While this technique provides that the ends of the bundle are closed, the looping of the hollow fibers to form the hanks can provide stresses which may damage the hollow fiber membranes, and it may be difficult to obtain a desirable population distribution of the hollow fiber membranes in the tube sheet. An uneven population distribution of the hollow fiber membranes may result in poor distributions of fluid in the permeator at the exterior of the hollow fiber membranes during separation operations. Hence localized areas within the permeator may have little fluid flow while other areas may have such substantial fluid flow that, e.g., when the feed to the permeator is fed to the exterior of the hollow fiber membranes, a significant portion of the feed may pass through a permeator without separation.

In single-ended permeators, the plug end of the bundle may be formed by looping the hollow fiber membranes or by plugging the open ends of the hollow fiber membranes. Bundles in which the plug end is formed by looping the hollow fiber membranes may result in an uneven population distribution and/or stresses being placed on the hollow fiber membranes which could damage the membranes. The problem of stresses on the looped portion of the hollow fiber membranes may be further amplified when the bundle is designed to tightly fit within the shell of the permeator in order to prevent fluid by-passing between the bundle and the vessel containing the bundle. Thus, the plug end has typically been formed by embedding the ends of the hollow fiber membranes in a solidifiable material. Although this procedure provides a high reliability of proper closure of the hollow fiber membranes at the plug end, the handling steps attendant with embedding the hollow fiber membranes in a solidifiable material may increase the risk of damage to the membranes. Moreover, the casting and solidification operations to form the plug end may require significant time, e.g., one or more days, to complete.

Since the hollow fiber membranes in a bundle often are varying in length, it may be desirable to trim the bundle such that the hollow fibers are substantially the same length to facilitate further processing of the bundle in fabricating the permeator. In these trimming operations, and possibly other cutting operations, small pieces of waste hollow fiber membrane may be generated. Difficulties may exist in maintaining the work area free of these waste particles, and any waste particles which may become lodged in the bundle could result in stresses on the hollow fiber membranes during permeator fabrication operations which stresses may deleteriously affect the membranes.

Accordingly, alternatives to cutting operations using sharp knives are sought which alternatives enable fabrication of permeators with a minimal number of handling steps and a minimal application of pressure or stresses which might adversely effect the hollow fiber membranes.

The use of heat to sever textile fibers has been proposed. For instance, *Central Patents Index*, published by Derwent Publications, Ltd., Sept. 6, 1973, reports at accession number 427984 that Japanese patent publication 7325005 discloses a process for preparing hollow staple fibers by cutting a sheathed hollow fiber with a hot cutter wherein the temperature of the hot cutter is higher than the melting point of the material of the inner hollow fiber but less than the melting temperature of the material of the sheath. It was further noted that the resultant hollow staple fiber had sealed ends and thus the penetration of soil into the hollow fiber is eliminated without losing the advantages (apparently excellent insulating properties and light weight) of hollow fibers.

The requirements for severing and sealing hollow fiber membranes, however, are much more demanding than those for preparing hollow staple fibers for textile applications. For instance, a hollow fiber membrane, after being severed, should retain its strength in order to be able to withstand advantageous pressure differentials for separation operations. The rupturing of even a few hollow fiber membranes during separation operations can significantly adversely effect the selectivity achievable by the permeator. Moreover, the closure formed by sealing the end of a hollow fiber membrane must be essentially fluid tight especially when the closure provides the plug end. The plug end should desirably exhibit at least as great strength as exhibited by the hollow fiber membrane. Also, the plug end of each of the hollow fiber membranes in a permeator should be sealed in an essentially fluid tight manner since the existence of even a few open hollow fiber membranes can significantly adversely affect the selectivity achievable by the permeator. Although techniques are available for obviating the effect of these "leaky" hollow fiber membranes, this repair can be difficult, time consuming, and often the repair results in a loss of available membrane surface area. Hollow staple fibers, on the other hand, need not tolerate pressure differentials such as are often employed in separation operations. Moreover, the presence of ruptured hollow staple fibers or leaky hollow staple fibers will not be of consequence with respect to their intended use.

The use of heat and pressure to repair permeators having leaky hollow fiber membranes has been proposed by Hoffman, III, et al., in U.S. Pat. No. 3,968,192, issued July 6, 1976. In the proposed method, the leaky hollow fiber membrane is located in an assembly of a plurality of hollow fiber membranes, which are embedded in and extend through a fusible resin tube sheet. The face of the tube sheet is heated in the immediate vicinity of the location of the leaky hollow fiber and pressure is applied to the heated region with a rod means. This repair operation can be accomplished using an electric soldering gun with a small tip. The pressure applied by the rod means is apparently, at least to some extent, axial with respect to the orientation of the hollow fiber membrane. Hence, the rod means would be expected to cause the melted material of the hollow fiber, and possibly the tube sheet, to flow into the bore hollow fiber membrane to cause plugging.

In accordance with this invention there are provided processes for severing a plurality of hollow fiber membranes which are arranged in the form of a bundle and also sealing the bores of these hollow fiber membranes in an essentially fluid-tight manner. The processes of this invention can be readily accomplished and effect the severing and sealing of hollow fiber membranes in as little as a single operation. Moreover, the processes involve a minimal amount of handling of the hollow fiber membranes, and need not subject the membrane to pressures during severing and sealing, which handling and pressures may result in risks of damage to the hollow fiber membranes. The processes of this invention can be relatively noncomplex and need not require high levels of operator skill in order to provide severed and sealed membranes in which essentially all of the hollow fiber membranes in the bundle are sealed in the desired, essentially fluid-tight manner. Hence, the severing and sealing of hollow fiber membranes in accordance with this invention can often be readily accomplished without any significantly decrease in membrane performance or strength. Furthermore, the processes of this invention can be accomplished with relative safety.

In the processes of this invention, a plurality of hollow fiber membranes comprised of thermoplastic material are arranged in the form of a bundle; a heated member is passed through said zone in a path transverse to the orientation of the hollow fiber membranes, said heated member being at a temperature above the melt temperature of the hollow fiber membranes and being passed through said zone at a rate sufficient to effect severing and sealing the bores of the hollow fiber membranes in an essentially fluid-tight manner; and maintaining the bundle adjacent the path of the heated member in substantially a desired cross-sectional configuration during the passing of said heated member through the bundle. Advantageously, at least a portion of the hollow fiber membranes in the zone adhere to adjacent hollow fiber membranes after the severing due to the melting and softening of the thermoplastic material of the hollow fiber membranes during the severing and sealing. When a substantial portion of the hollow fiber membranes adhere to one and another (i.e., the ends of the hollow fiber membranes are matted) the severed end of the bundle may be capable of substantially maintaining its cross-sectional configuration without external support. Since often adjacent hollow fiber membranes are matted together due to the severing, waste from, e.g., trimming operations, may be in the form of agglomerated hollow fiber properties, thereby facilitating removal of debris from the work areas.

In a preferred aspect of the process of this invention, the hollow fiber membranes which are severed and sealed have walls with a substantial void volume. Voids are regions within the walls of the hollow fiber membranes which are vacant of the material of the hollow fiber membranes. Thus, when voids are present, the density of the walls of the hollow fiber membrane is less than the density of the bulk of material of the hollow fiber membrane. It has been found by this invention that hollow fiber membranes having walls with a substantial void volume can often be more readily severed and sealed than can hollow fiber membranes of the same material and bore dimensions but having dense walls. Moreover, even when the hollow fiber membranes are anisotropic with thin and highly fragile dense skins (especially exterior skins), the severing and sealing can be accomplished without adversely affecting the membrane performance or strength. Frequently, the void volume in accordance with this aspect of the invention is about 20 to 80, and most often, about 30 to 70, percent based on the superficial volume, i.e., the volume contained within the gross dimensions of the walls of the hollow fiber membrane.

Since the severing and sealing operations are conducted substantially simultaneously by passage of the heated member through the bundle, less opportunity exists for skill to have an effect on the severing and sealing operations. Moreover, only minimal time may be required in a manufacturing procedure to sever and seal the hollow fiber membranes thereby increasing the efficiency of the permeator manufacturing operation. Furthermore, the severed and sealed bundle of hollow fiber membranes is almost immediately available for further processing for manufacturing a permeator. Advantageously, these benefits can be achieved utilizing relatively non-complex, and hence inexpensive, severing apparatus.

Any suitable heated member may be employed in the processes of this invention. The heated member need not be sharp since the heat emitted from the heated member substantially achieves the severing. Hence heated members which can be advantageously utilized may even be blunt and have a radius of curvature of up to 0.5 millimeter or more. Convenient heated members can include wires, ribbons (including untwisted as well as twisted or helically wound ribbons), blades, rods, bars, and the like.

The heated member may be exclusively preheated or may be capable of being heated during the severing such as by electrical resistance. If the heated member is exclusively preheated, sufficient heat should desirably be retained within the heated member to effect the severing and sealing of substantially all of the hollow fiber membranes in the zone of the severing in a single pass. Otherwise plural passes of the heated member into the bundle may be required in order to effect the desired severing and sealing. The use of such plural passes may increase the risk that bores of the hollow fiber membranes are not desirably sealed as well as increase the time and effort required to sever and seal the hollow fiber membranes. When the heated member is exclusively heated prior to the severing, it is desirable that it be sufficiently large with respect to its heat capacity that adequate heat is available for severing and sealing substantially all of the hollow fiber membranes in the zone for severing. However, although less convenient, the zone of hollow fiber membranes may be severed a portion at a time.

Most preferably, the heated member is heated during the severing. Any suitable means may be employed to provide heat to the heated member during the severing. In such heated members, usually sufficient heat is produced during the severing to effect the severing and sealing. Thus, the severing and sealing can be effected in a single pass. Accordingly, cross-sectional dimensions and heat capacity of the heated member may not be as important a consideration as when the heated member is heated exclusively before the severing.

The heated member may be heated by any suitable means. For instance, heat may be supplied to the heated member in a region remote from the region which passes through the bundle of hollow fiber membranes, and the heat is transmitted by conduction through the heated member. A particularly attractive and convenient means to heat the heated member during severing is by applying an electrical current through the heated member wherein the heated member is composed of an electrical resistance material such as Nichrome TM alloy (an alloy containing nickel, chromium and iron). When utilizing an electrical current passing through the heated member as the means to generate heat, it is usually preferred for purposes of safety that relatively low voltages are employed. The cross-sectional area of the heated member should therefore be adequate to enable the generation of adequate heat and temperature for severing and sealing the hollow fiber membranes at these lower voltages.

The heated member must be at a temperature above the melt temperature of the hollow fiber membranes. If the temperature is too low, the bores of the hollow fiber membranes will not seal in the desired fluid-tight manner. The maximum temperature which can be desirably employed, of course, depends upon the materials composing the hollow fiber membranes. The temperature of the heated member should not be so great that undue degradation of the material of the hollow fiber membranes occurs which significantly reduces the strength of the hollow fiber membrane. Sometimes, however, the material of the hollow fiber membrane, which contacts or is in very close proximity to the heated member during severing, may be degraded. Although such degradation may not adversely affect the hollow fiber membranes, suitable ventilation may be required to remove noxious fumes which might be generated during the severing. The severing may be accomplished in an inert atmosphere to minimize degradation; however, in many instances, the severing can be conducted in air without undue adverse effects. Also, with some thermoplastic materials, if the temperature of the heated member is too high, the hollow fiber membranes may become sticky, or tacky, and increase the difficulty in severing the hollow fiber membranes.

The temperature of the heated member will, in part, be determined by the melt temperature and the flow properties of the material of the hollow fiber membranes. Since frequently the hollow fiber membranes are comprised of amorphous polymer, the polymer melt temperature may be difficult to precisely determine. Moreover, depending on the properties of the polymer melt the minimum temperature above the polymer melt temperature which may be required to effect severing and sealing may vary. In general, however, the temperature of this heated member is preferably at least about 10° C., say, at least about 50° C., and most frequently, at least about 100° C. above the melt temperature of the hollow fiber membrane. The melt temperature as used herein is the temperature at which the hollow fiber membrane leaves a liquid trail when advanced across a temperature gradient bar. Often the temperature of the heated member, at least prior to initiation of the severing and sealing operation, is at least about 650° C. or 700° C., and sometimes about 700° C. to 950° C. or 1000° C. Generally, for any given hollow fiber membrane the heated member may be operated within a wide range of temperatures with obtaining suitable severing and sealing.

Since measuring the temperature of the heated member often requires equipment such as pyrometers which may not be readily available and the temperature of the heated member during the severing may be extremely difficult to precisely ascertain, a convenient method for determining whether the heated member has achieved an appropriate temperature is to sever a small bundle of hollow fiber membranes. If the heated member readily passes through the bundle and melting is observed, the heated member is probably at an adequate temperature for severing and sealing, otherwise the temperature should be increased. If undue degradation of material in the hollow fiber membrane or sticking is noted, the temperature of the heated member should desirably be lowered or, if the degradation is due to combustion, an inert atmosphere may be desirable.

The severing of the hollow fiber membranes in accordance with this invention is believed to be caused by the melting of the thermoplastic material of the hollow fiber membrane in the zone through which the heated member is passed. The thermoplastic material of the hollow fiber membranes immediately adjacent to the heated member is often sufficiently fluid such that the thermoplastic material can flow by capillary action and/or under the influence of gravity into the bores of the hollow fiber membranes in order to provide the desired sealing. Hence, sometimes the application of an axially-applied pressure to cause such flowing and sealing (e.g., pressure provided by a surface abutting the ends of the hollow fiber membranes) is advantageously not required. It is believed that at least in some instances the heated member need not contact the hollow fiber membranes in order to effect the severing and melting. In other instances, the heated member may assist in moving the melted thermoplastic to close the bores. It has frequently been found that the selection of the material of heated member need not be restricted to only those materials which are not readily wet by the material of the hollow fiber membranes.

The rate at which the heated member is passed through the bundle is such that the bores of the hollow fiber membranes are sealed in an essentially fluid-tight manner. If the heated member is passed through the bundle too quickly, a tendency will exist for at least some of the bores to remain open. Frequently, when the heated member is at higher temperatures, the heated member may be capable of being more quickly passed through the bundle than at lower temperatures. Also, in many instances, the heated member can be passed through the bundle more quickly when the hollow fiber membranes have a significant void volume than when the hollow fiber membranes are dense and have substantially the same bore dimensions and mass of polymer per unit length.

Usually, the heated member is passed through the bundle slowly, e.g., at a rate of less than about 50 centimeters per minute, and most frequently, less than about 10 centimeters per minute. The heated member often passes through the bundle relatively effortlessly, indicating that primarily the heat from the heated member is effecting the severing of the hollow fiber membranes. In most instances, the passage of the heated member through the bundle is sufficiently slow that a visibly discernable zone, which zone is indicative of the melting of the thermoplastic comprising the hollow fiber membranes, exists. Similar zones are usually visible on either side of the path of the heated member. Conveniently, the heated member is passed through the bundle at a rate such that the zone preceding the heated member is approximately the same thickness as the zones on each of the side of the path. Usually, the zone is at least about 0.1, e.g., at least about 0.25, times the diameter of the hollow fiber membrane, and in some instances this thickness is about 0.2 to 10, say, about 0.5 to 5, millimeters. Once a suitable rate is determined for passing the heated member through the bundle, it can be readily appreciated that a mechanized, e.g., motorized, drive means could be used to move the heated member through the bundle at the predetermined rate. Thus, the severing and sealing can be effected on a highly reliable basis.

The severing of the hollow fiber membranes is transverse to the longitudinal orientation of the hollow fiber membranes. Since some processes of this invention do not require that pressure be applied perpendicularly to the cross-section of the hollow fiber membranes in order to obtain the sealing of the bores of the hollow fiber membranes, wide flexibility is offered in the shape of the severed end. For instance, the end of the bundle may be substantially flat and perpendicular to the longitudinal orientation of the hollow fiber membranes, or it may be at an angle to the orientation of the hollow fiber membranes. Alternatively, the end of the bundle may be curved, e.g., convexly, concavely, or both, or it may be hemispherical, conical, or such other shapes as may be suitable. Frequently, it is preferred that the end of the bundle be substantially flat and perpendicular to the longitudinal orientation of the hollow fiber membranes for sake of convenience in manufacturing.

Preferably, the hollow fiber membranes are substantially dry (e.g., the membranes contain less than about 5, e.g., less than about 1 or 2, weight percent liquid) during the severing such that the heat of the heated member is utilized for severing and sealing and not for evaporating liquid, e.g., water.

In some instances it may be desired to ensure that essentially all of the hollow fiber membranes are sealed and adhered to one and another at the severed end of the bundle. Although substantially all the bores of the hollow fiber membranes are sealed from the severing, it may be desirable to apply heat and, if necessary, axially applied pressure to the ends of the hollow fiber membranes such that the hollow fiber membranes are adhered to one and another at the end of the bundle and closing of virtually all of the bores is ensured. Preferably, the ends of the hollow fiber membranes are heated to a temperature above the melt temperature of the hollow fiber membranes, and the pressure (if utilized) be applied while the thermoplastic material is melted in order to join the ends of the hollow fiber membranes. Caution should be exercised in order that no undue damage occurs to the hollow fiber membranes. Usually, if any axially-applied pressure is required, a relatively small pressure will be sufficient in order to enable sufficient flowing of the thermoplastic material to join together the ends of the hollow fiber membranes in the bundle. Advantageously, the pressure is supplied by a surface which is continually being heated, e.g., by electrical resistance generating the heat at the surface or by conduction of heat to the surface. Highly suitable surfaces for joining the ends of the hollow fiber membranes are flat tipped soldering irons, flat ribbons of electrical resistance material such as Nichrome TM, and the like.

Most often, the ends of the hollow fiber membranes will readily join during the severing of the bundle. This joining may significantly detract from the ability of fluids to pass between the hollow fiber membranes at the end of the bundle. For instance, in embedding the end of the bundle into resinous mass for, e.g., forming a tube sheet, it is necessary for the liquid resinous mass to pass throughout the end of the bundle of hollow fiber membranes in the region which is designed to be embedded in the resinous mass. If the severed end of the bundle is highly matted, substantially all of the resinous mass passing into the bundle must enter from the sides of the bundle. Accordingly, substantial risks exist that the resinous mass will not be sufficiently uniformly distributed throughout the cross-section of the hollow fiber membrane bundle, particularly in the interior, or middle, regions of the hollow fiber membrane bundle. In the copending United States patent application of Harry P. Holladay Ser. No. 078,873, filed Sept. 26, 1979, issued as U.S. Pat. No. 4,276,249, filed concurrently herewith, (herein incorporated by reference) there is disclosed and claimed a technique for enhancing the openness between the hollow fiber membranes at the end of the bundle. In this technique, an insert member is placed within the bundle of hollow fiber membranes at the zone to be severed to act as a barrier to the joining of the hollow fiber membranes during the severing. The severing also cuts the insert member, e.g., by charring, melting or pressure. Subsequent to the severing, the insert member may be removed, or if desired, it may be retained within the hollow fiber bundle. The insert member thus provides fluid passageways at the end of the bundle which can, for instance, facilitate permeation of a liquid resinous material at the end of the bundle for forming a tube sheet or plug end, and the passageways may also enhance fluid distribution within the bundle during a fluid separation operation.

The hollow fiber membranes at the zone through which the heated member is to pass to effect severing should preferably be arranged and maintained, during severing, in substantially the desired cross-sectional configuration for the bundle when assembled in a permeator. Clearly, any manipulation of the configuration of the severed end of the bundle containing joined membrane may increase the risk of damage to the hollow fiber membranes, and should be avoided. The zone through which the heated member passes during the severing may be maintained in the desired cross-sectional configuration by any suitable means. For instance, when the cross-sectional configuration of the bundle is sought to be circular, sufficient support for maintaining the desired configuration of the bundle at the zone may be supplied by wrapping or binding the bundle at, or adjacent to, the zone. Alternatively, rigid supports for holding the bundle in a desired configuration may be provided on either or both sides of the zone. With bundles which have small cross-sections or where significant tolerances in cross-sectional configuration are acceptable, the cross-sectional configuration of the bundle at the zone to be severed may be sufficiently maintained by hand.

The processes of this invention may find application for severing and sealing of bundles having a wide variety of cross-sectional configurations and dimensions. The cross-sectional configuration may be circular, oval, polygonal (e.g., rectangular, square, trapezoidal, etc.) free form, or the like. The maximum cross-sectional dimension of a bundle may be up to 1 meter or more. The processes of this invention are also applicable for severing test bundles, e.g., bundles which may contain as few as 5 or 10 hollow fiber membranes. Bundles having circular cross-sectional configurations are often most preferred for use in permeators and frequently have cross-sectional diameters of, e.g., about 0.02 or 0.05 to 0.5 or 1 meter.

The processes of this invention may be useful in severing and sealing bundles having a wide variety of packing factors of the hollow fiber membranes. A packing factor, as used herein, is the percentage of a given cross-sectional area which is occupied by hollow fiber membranes (including the area occupied by the bores of the hollow fiber membranes). The packing factor based on the inside cross-sectional dimensions of the permeator shell and the cross-sectional area of the hollow fiber membranes is preferably at least about 35, say, about 40 or 45 to 50 or 60, percent. The packing factor based on the inside dimensions of the permeator shell may be different than the actual packing factor of the bundle at the zone to be severed. In many instances it may be desired to laterally compact the zone which is to be severed. This lateral compaction may enhance the joining of adjacent hollow fiber membranes at the end of the severed bundle. Especially when the hollow fiber membranes are sufficiently joined together at the severed end and the end retains its cross-sectional configuration without external support, the lateral compaction facilitates the insertion of the bundle of hollow fiber membranes into a permeator shell or into a mold for casting, e.g., a tube sheet. Most frequently, the actual packing factor of the zone the bundle to be severed based on the outside dimensions of the bundle at the zone through which the heated member is to be passed is sufficiently high that substantially all of the hollow fiber membranes contact other hollow fiber membranes in the zone. Often the actual packing factor of this zone is at least about 45 percent and may range up to 70 or more percent, e.g., about 50 to 65 percent.

The hollow fiber membranes may be of any suitable cross-sectional configuration although most frequently hollow fiber membranes are circular with a concentric bore. The processes of this invention are useful for severing hollow fiber membranes within a wide range of diameters. However, the hollow fiber membranes should have sufficient wall thickness to provide adequate strength during the intended separation operation. Frequently, the outside diameter of the hollow fiber membranes is at least about 20, say, at least about 50, microns, and the same or different outside diameter hollow fiber membranes may be contained in a bundle. Often, the outside diameters are up to about 800 or 1,000 microns. Preferably, the outside diameter of the hollow fiber membranes is about 50 to 800 microns, say about 150 to 800 microns. Generally, the wall thickness of the hollow fiber membranes is at least about 5 microns, and in some hollow fiber membranes, the wall thickness may be up to about 200 or 300 microns, say, about 50 to 200 microns. Preferably, the inside diameter (bore diameter) of the hollow fiber membranes is less than about 500 microns, e.g., about 50 to 500, microns, say, about 50 to 300 microns, The processes of this invention are useful in severing and sealing hollow fiber membranes which have solid walls as well as those hollow fiber membranes having walls with a substantial void volume. The hollow fiber membranes may be isotropic or anisotropic.

The bores of the hollow fiber membranes should be substantially unobstructed. The severing of the hollow fiber membranes in accordance with this invention should only obstruct the bores of the hollow fiber membranes at the severed end of the bundle. Often the thickness of the material closing the bores of the hollow fiber membranes is at least about 25 or 50, say, at least about 75 or 100 to about 1000 or 5000, microns, The hollow fiber membranes may be fabricated from any synthetic or natural material which is suitable for fluid separations or for a support for materials which effect the fluid separations. The hollow fiber membrane comprises thermoplastic material, and preferably the thermoplastic material comprises at least about 70, or 80 or more, weight percent of the hollow fiber membrane. The selection of the material for the hollow fiber membrane may be based on the heat resistance, chemical resistance, and/or chemical strength of the hollow fiber membrane as well as other factors dictated by the intended fluid separation for which it will be used and the operating conditions to which it will be subjected.

Typical materials for hollow fiber membranes include thermoplastic organic polymers or thermoplastic organic polymer mixed with inorganics, e.g., fillers, reinforcements, and the like. Thermoplastic polymers which may be suitable for hollow fiber membranes can be substituted or unsubstituted polymers, especially carbon based polymers having carbon-carbon or carbon-oxygen backbones, and may be selected from polysulfones; poly(styrenes), including styrene-containing copolymers such as acrylonitrilestyrene copolymers, styrene-butadiene copolymers and styrenevinylbenzylhalide copolymers; polycarbonates; cellulosic polymers (thermoplastic); polyamides and polyimides, including aryl polyamides and aryl polyimides; polyethers; poly(arylene) oxides such as poly(phenylene oxide) and poly(xylylene oxide); poly(esteramidediisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as poly(ethylene), poly (propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly (vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amines), poly(vinyl phosphates), and poly(vinyl sulfates); and poly(vinyl acetal); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of parasulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

The following examples are provided to further illustrate the invention and are not intended to limit the invention.

EXAMPLE 1

A 24 gage Nichrome TM wire (3.5 ohms per 30.5 centimeters) extends between and is fastened to two bolts which are mounted on an electrically insulated stand. The bolts are about 6 to 8 centimeters apart. Each of the output leads from a variable transformer (110 volt) is attached to the Nichrome TM wire about 4 centimeters apart. The resistance at room temperature between output leads is about 0.5 ohms. Approximately 1.5 to 2 volts are delivered by the transformer to the wire and the wire appears "red hot".

Each of a group of ten test bundles containing 10 anisotropic hollow fiber membranes having an external skin is held by hand and passed through the hot wire substantially perpendicular to the orientation of the hollow fiber membranes to sever the end portion of the bundle. The hollow fibers consist of polysulfone (P-3500 TM available from Union Carbide Corporation) which has the repeating structure

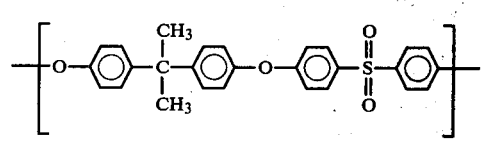

The hollow fibers have an external diameter of about 450 microns, an internal diameter of about 150 microns, and a void volume of about 60 percent. The external skin is less than 0.5 micron in thickness and have an open wall structure. No open bores can be visually observed upon inspection of the severed end of the test bundle. The severed ends of the hollow fibers appear to be joined (or matted) together.

Similar test bundles (three) are prepared for comparative purposes except that the end of the bundle is severed with a razor blade and is plugged with epoxy in a fluid tight manner. The epoxy is encased in a glass tip.

The hot wire severed test bundles and the epoxy encased test bundles are coated using a solution of one percent Sylgard TM 184 (a polysiloxane available from Dow Corning Corp.) in isopentane for 10 minutes and then tested for hydrogen and methane permeabilities and failure (collapse) pressures under external load. These procedures are substantially repeated except that the polysulfone hollow fibers have an outside diameter of about 560 microns and an inside diameter of about 250 microns. The results are provided in the following table.

similar to that described in Example 1 provides sealing of all the hollow fiber membranes in the bundle.

|  | Inside Diameter, Microns | No. of Samples | Collapse Pressure, K/cm² | | Permeability, cm³(STP)/(cm²)(sec)(cmHg) × 10⁶ | | | |
|---|---|---|---|---|---|---|---|---|
|  |  |  | Mean | Std. Deviation | H₂, Mean | H₂, Std. Deviation | CH₄, Mean | CH₄, Std. Deviation |
| Hot Wire Cut | 150 | 10 | 130 | 5.9 | 86.9 | 7.06 | 2.11 | 0.39 |
|  | 250 | 10 | 103 | 6.8 | 71.8 | 15.9 | 1.00 | 0.33 |
| Epoxy in Glass | 150 | 3 | 124 | 8.1 | 81.7 | 5.68 | 1.23 | 0.23 |
| Tip | 250 | 3 | 86.7 | 32.4 | 94.4 | 18.8 | 1.2 | 0.17 |

EXAMPLE 2

The procedure of Example 1 is substantially repeated except that the hollow fiber membrane consists of a styrene/acrylonitrile copolymer containing 53 weight percent of styrene and has an outside diameter of about 540 microns, an inside diameter of about 340 microns, and a void volume of about 60 percent. Sufficient hollow fiber membranes are employed to provide a bundle having about a 50 percent packing factor and diameter of about 2 centimeters. An apparatus similar to that disclosed in Example 1 is employed to sever the bundle. About 1.6 volts are delivered to the hot wire. The hot wire is also passed through the bundle at a rate of about 10 centimeters per minute. The bores of the hollow fibers appear under visual inspection with a microscope to be closed and substantially all of the hollow fiber membranes are joined to adjacent hollow fiber membranes at the severed end. If the voltage to the hot wire is reduced, the bores of the hollow fiber membranes do not appear to close. Similarly, if the rate of passing the hot wire through the bundle is increased, e.g., by a factor of about 2 or more, the bores do not appear to close.

EXAMPLE 3

The procedure of Example 1 is essentially repeated except that the polysulfone hollow fiber membranes are melt-spun, have substantially void-free walls, and have an outside diameter of about 310 to 320 microns and a wall thickness of about 50 microns. About 2800 hollow fiber membranes are used to make a bundle about 2.5 centimeters in diameter. An apparatus similar to that disclosed in Example 1 except that a Nichrome TM ribbon having a thickness of about 0.025 centimeter and a width of about 0.16 centimeter is employed instead of a wire. The ribbon is positioned such that the face of the end of the bundle would be parallel to the width of the ribbon. The distance between the output leads from the transformer is about 3.2 centimeters and the resistance between the leads is about 1 ohm at room temperature. Approximately 2.4 volts is used to energize and heat the hot ribbon. The ribbon is passed through the bundle at a rate of about 7 centimeters per minute and a slight force is provided such that the surface of the ribbon contacts and smears the melted polysulfone. The bores of the hollow fiber membranes are sealed and the hollow fiber membranes are joined at the severed end.

If a hot wire is used instead of a hot ribbon, a tendency exists for a few of the hollow fiber membranes at the outside of the bundle to not be sealed. By smearing the melted polysulfone through contact with the ribbon, closing of the bores of all the hollow fiber membranes in the bundle appears to be ensured. With smaller bundle diameters, e.g., containing only about 100 melt-spun polysulfone hollow fibers, the use of an apparatus similar to that described in Example 1 provides sealing of all the hollow fiber membranes in the bundle.

EXAMPLE 4

A bundle of approximately 100,000 anisotropic polysulfone hollow fiber membranes similar to those described in Example 1, is prepared and has a generally circular cross-sectional configuration. The end of the bundle is bound tight (about 18 centimeter diameter) with tape to assist in maintaining the desired configuration. The bundle is hung vertically with the bound end down.

A 24 gage Nichrome TM wire is mounted between two coil springs which are fastened to insulators supported at the ends of a "U"-shaped arm. One end of the arm is pivotably mounted on a stand such that the wire extends radially from the pivot point and the wire and the arm pivot in a horizontal plane. The depth of the "U"-shaped arm is about 30 centimeters and the width of the arm is about 30 centimeters. A variable transformer is connected to the wire with the leads being about 30 centimeters apart. The resistance at room temperature between connections is about 3.5 ohms. The stand is positioned such that the arm, when pivoted, can move horizontally with the hot wire passing through the bundle substantially perpendicular to the orientation of the hollow fiber membrane. The height of the arm is adjusted that the severing of the bundle will be at the desired location. The bundle is held above and below the desired location for the severing using thick elastic bands which are affixed to a support stand. About 12 to 14 volts is passed through the wire and the wire becomes red hot. The arm is pivoted in order to pass the hot wire through the bundle. The hot wire is moved slowly through the bundle, say at about 5 to 10 centimeters per minute. A band of discoloration from charring and melting of about 1 millimeter in thickness is observed at both sides of the path of the hot wire after severing. The hot wire is passed through the bundle sufficiently slowly that a similar band appears to preceed the hot wire. The end of the bundle is severed and the bores of the hollow fiber membranes are sealed by the use of the hot wire. The hollow fiber membranes are joined at the severed end.

It is claimed:

1. A process for simultaneously severing and sealing the bores of a plurality of thermoplastic hollow fiber membranes comprising passing a heated member through a bundle consisting of said plurality of hollow fiber membranes in a path transverse to the longitudinal orientation of the hollow fiber membranes, said heated member being at a temperature above the melt temperature of the thermoplastic hollow fiber membranes and being passed through said bundle at a rate less than 50 centimeters per minute, said rate being sufficient to effect severing and sealing the bores of the hollow fiber membranes in an essentially fluid-tight manner; and maintaining said bundle adjacent to the path of said heated member in substantially a desired cross-sectional configuration during the passing of the heated member through said bundle; wherein adjacent hollow fiber membranes adhere to one and another in a zone of thermoplastic material at least about 0.2 millimeters thick such that the hollow fiber membranes at the end of the bundle formed by the severing are substantially maintained in the same desired cross-sectional configuration in the absence of external support.

2. The process of claim 1 wherein heat is provided to the heated member during the severing and sealing.

3. The process of claim 2 wherein the heated member comprises an electrical resistance material and heat is generated by passing an electrical current through the heated member.

4. The process of claim 3 wherein the heated member is a wire.

5. The process of claim 1 or 3 wherein the temperature of the heated member is at least about 50° C. above the melt temperature of the thermoplastic hollow fiber membranes.

6. The process of claim 5 wherein the temperature of the heated member is about 700° to 950° C.

7. The process of claim 1 or 3 wherein the inside diameter of the thermoplastic fiber membrane is about 50 to 500 microns.

8. The process of claim 7 wherein the thermoplastic hollow fiber membranes have walls with a substantial void volume.

9. The process of claim 8 wherein the thermoplastic hollow fiber membranes are anisotropic with a thin, dense exterior skin and have a void volume of about 30 to 70 percent.

10. The process of claim 9 wherein the hollow fiber membrane comprises polysulfone.

11. The process of claim 10 wherein the temperature of the heated member is at least 700° C.

12. The process of claim 1 or 3 wherein the bundle at the path through which the heated member passes has a packing factor of about 50 to 65 percent.

13. The process of claim 1, 11 or 3 wherein the thickness is about 0.2 to 10 millimeters.

14. The process of claim 1 wherein said desired cross-sectional configuration is substantially circular.

15. The process of claim 14 wherein said bundle has a cross-sectional diameter of greater than about 0.02 meters.

16. The process of claim 15 wherein said cross-sectional diameter is greater than about 0.05 meters.

17. The process of claim 16 wherein said heated member comprises a wire of an electrical resistance material and heat is generated by passing an electrical current through said heated member.

* * * * *